United States Patent [19]

An

[11] Patent Number: 5,278,705

[45] Date of Patent: Jan. 11, 1994

[54] PHASE CORRECTION CIRCUIT

[75] Inventor: Hong-jo An, Kwangmyung, Rep. of Korea

[73] Assignee: SamSung Electronics Co., Ltd., Kyungki, Rep. of Korea

[21] Appl. No.: 801,857

[22] Filed: Dec. 3, 1991

[51] Int. Cl.⁵ .................... G11B 15/14; G11B 15/18; G11B 17/00; G11B 19/02
[52] U.S. Cl. ......................................... 360/64; 360/69
[58] Field of Search ............... 360/64, 61, 70, 69, 360/77.12; 341/165

[56] References Cited

U.S. PATENT DOCUMENTS

| | | | |
|---|---|---|---|
| 3,577,194 | 5/1971 | Beall | 341/165 |
| 3,585,633 | 6/1971 | Young | 341/165 |
| 4,127,881 | 11/1978 | Wakami et al. | 360/70 |
| 4,531,162 | 7/1985 | Tokumitsu | 360/70 X |
| 4,706,137 | 11/1987 | Tanaka | 360/64 |
| 4,914,534 | 4/1990 | Chito | 360/69 |
| 4,920,433 | 4/1990 | Ito | 360/64 |
| 5,089,919 | 2/1992 | Kozuki et al. | 360/69 X |

Primary Examiner—Aristotelis Psitos
Assistant Examiner—Jennifer Pearson
Attorney, Agent, or Firm—Robert E. Bushnell

[57] ABSTRACT

A phase-correction circuit comprises an amplifier, comparators, inverters, an S/R flip-flop, a switch and, a pulse width controller. The circuit sets a reference of recording position of a head to a tape and corrects the phase differences between the head, a magnet and a pulse generator, thereby realizing precise drum phase servo action and acquiring excellent audio and video recording and reproducing.

13 Claims, 4 Drawing Sheets

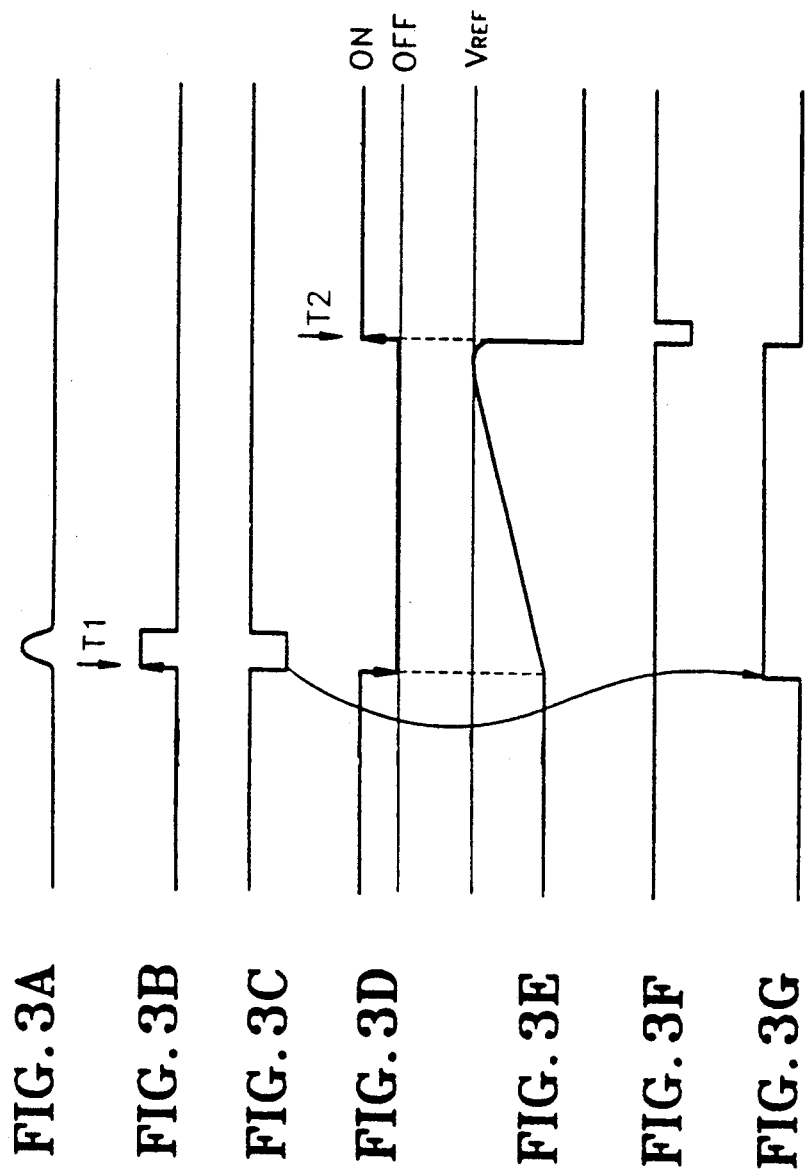

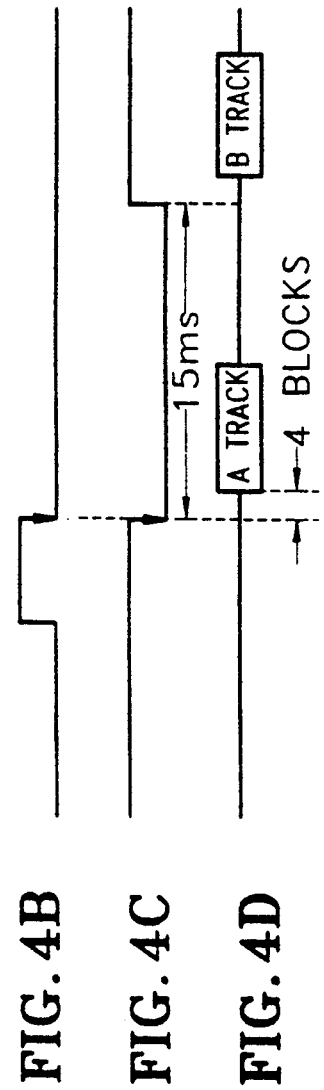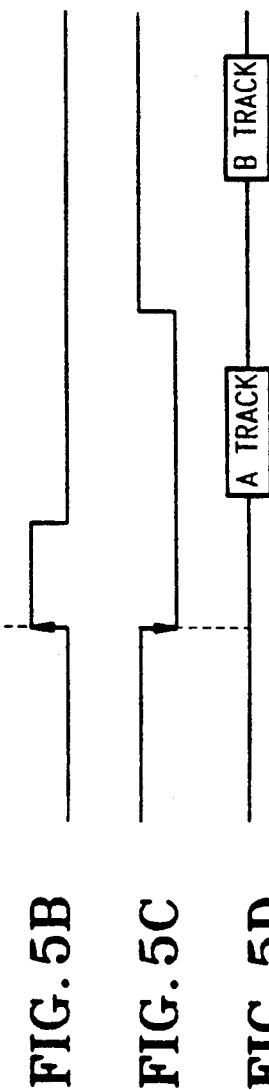

PHASE CORRECTION CIRCUIT

BACKGROUND OF THE INVENTION

The present invention relates to a recording/reproducing apparatus using a head drum, and more particularly to a phase-correction circuit for the recording/reproducing apparatus using a head drum.

In general, in recording/reproducing apparatuses using a head drum, such as a rotary digital audio tape recorder, a video tape recorder, etc., signals are not recorded continuously on a track of tape, but are cut and recorded in sections by a helical scanning method so that a trace start point of a head matches that of the track. This requires a drum phase servo as described below. In other words, in order to match the trace start point of the head to that of the track in which a signal is recorded, as shown in FIG. 1, a magnet is adhered to the head drum and a pulse generator detects the location of the magnet. The head is positioned at the trace start point, precisely when the magnet is detected by the pulse generator. A pulse of the pulse generator acts as a reference in forming a track during recording.

In the standard format of a digital audio tape recorder, the trace start point is located 0.6 mm from the bottom of tape. However, when a reference is not set, even if a drum is rotated at a normal speed, a track may not be formed at the center of the tape but in an upper or lower part thereof, or may even be omitted entirely.

SUMMARY OF THE INVENTION

Therefore, it is an object of the present invention to provide a phase-correction circuit for setting a reference of recording position of a head to a tape by generating a tacho pulse to correct for phase differences among the head, magnet and pulse generator.

To achieve the above object, in a data recording/reproducing apparatus including a head switching controller and a drum motor pulse generator, a phase-correction circuit of the present invention comprises a first means for converting an analog pulse signal DTP generated from the drum motor pulse generator during magnet detection to a logic signal, a second means for generating a tachometer pulse TP according to the state of the logic signal and a control signal generated from the first means, and for controlling the generation of a head switching signal SRT of the head switching controller, and a third means for controlling the second means according to the feed back tachometer pulse TP, to freely adjust the tachometer pulse width.

BRIEF DESCRIPTION OF THE DRAWINGS

The above object and other advantages of the present invention will become more apparent by describing in detail a preferred embodiment of the present invention with reference to the attached drawings in which:

FIGS. 3A-3G are timing diagrams for illustrating the operation of the circuit shown in FIG. 2;

FIGS. 4A-4D are timing diagrams for illustrating the relation between a tachometer pulse and a switching head pulse during normal mode;

FIGS. 5A-5D are timing diagrams for illustrating the relation between a tachometer pulse and a switching head pulse during FF/REW search mode.

DETAILED DESCRIPTION OF THE INVENTION

Figure 1:
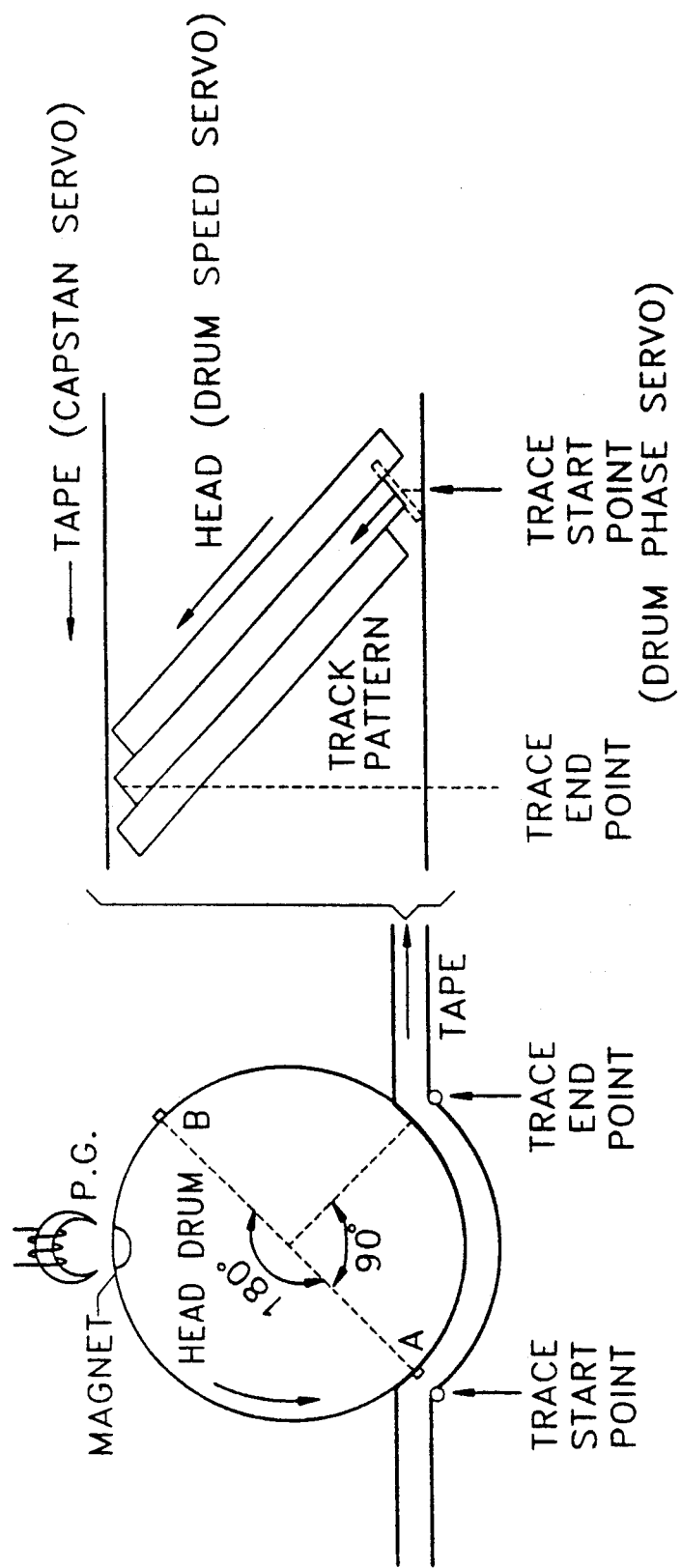
FIG. 1 illustrates the relation between a trace start point and a trace end point of both a head drum and a tape.
Figure 2:
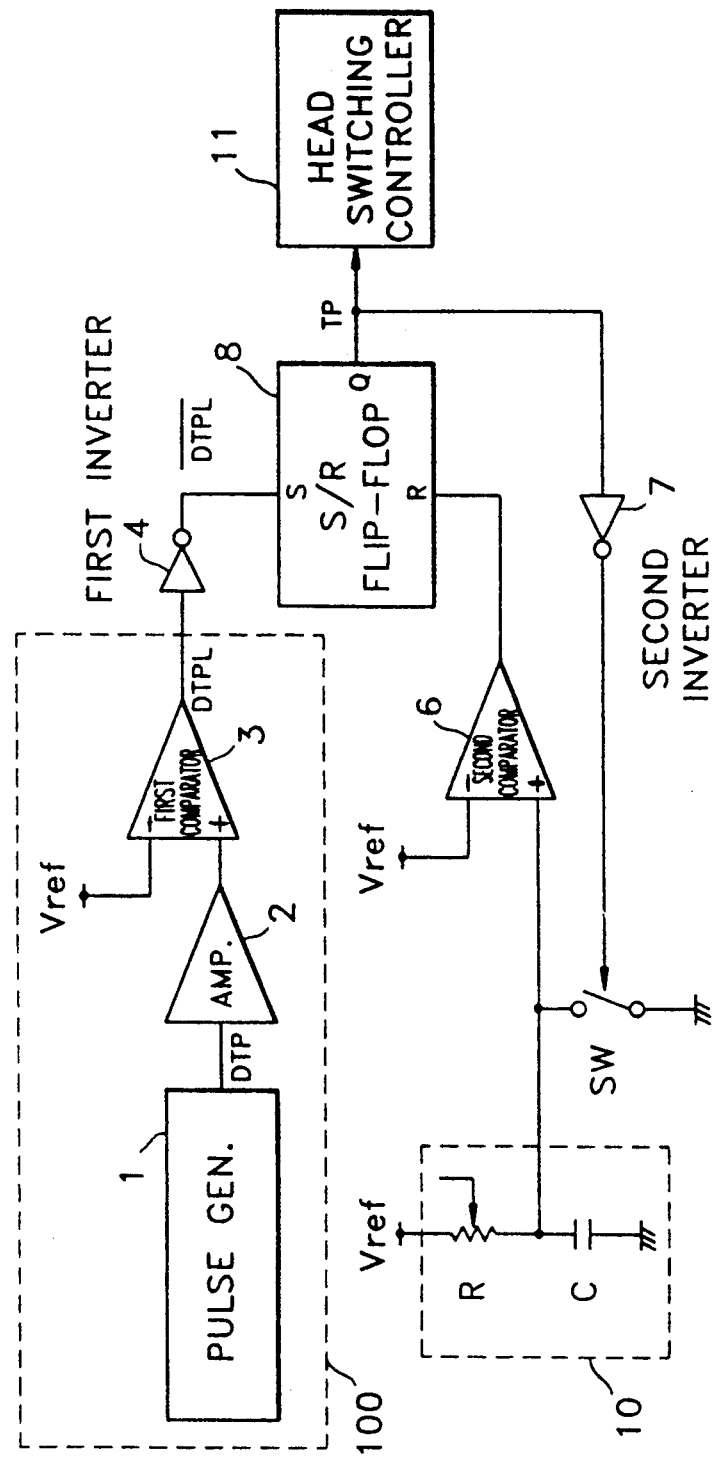
FIG. 2 shows a phase correction circuit according to the present invention.

Referring to FIG. 2, a phase-correction circuit of the present invention comprises a pulse generator 1 for detecting the location of a magnet adhered to a head drum and generating an analog pulse signal DTP of a predetermined state, an amplifier 2 for amplifying the analog pulse signal DTP to a predetermined level and outputting the pulse, a first comparator 3 for comparing the output of the amplifier 2 supplied to its non-inverting port with a certain reference voltage to generate a logic signal DTPL, a first inverter 4 for receiving the output of the first comparator 3 and inverting it, an S/R flip-flop 8 for generating a tachometer pulse TP according to the logic signal DTPL of the first inverter 4 fed to an input port S and a signal fed to another input port R, a second inverter 7 for receiving the tachometer pulse TP and inverting it, a pulse width controller 10 connected to a switch SW which is turned on or off according to the inverted tachometer pulse TP output from the second inverter 7, for correcting the width of the tachometer pulse TP according to the state of the switch SW, and a second comparator 6 for comparing the output of the pulse width controller 10 fed to its inverting port (−) with a reference voltage fed to its non-inverting port (+), and outputting the compared result to the input port R of the S/R flip-flop 8.

FIG. 3A is the waveform diagram of the output DTP of the pulse generator. FIG. 3B is the waveform diagram of the logic signal DTPL output from the first comparator 3. FIG. 3C is the waveform diagram of the output $\overline{DTPL}$ of the first inverter 4. FIG. 3D is the waveform diagram showing ON/OFF state of the switch SW. FIG. 3E is the waveform diagram of the output of the pulse width controller 10. FIG. 3F is the waveform diagram of the output of the second comparator 6. FIG. 3G is the waveform diagram of the output tachometer pulse TP of the S/R flip-flop.

FIG. 4A is the waveform diagram of the output DTP of the pulse generator 1, FIG. 4B is the waveform diagram of the tachometer pulse TP. FIG. 4C is the waveform diagram of a head switching pulse SWH. FIG. 4D is the waveform diagram of a recorded signal.

FIG. 5A is the waveform diagram of the output DTP of the pulse generator 1. FIG. 5B is the waveform diagram of the tachometer pulse TP. FIG. 5C is the waveform diagram of a head switching pulse SWH. FIG. 5D is the waveform diagram of a reproduced signal.

A detecting signal DTP of FIG. 3A is generated from pulse generator 1 during magnet detection according to the rotation of a drum motor. The detecting signal DTP is amplified by a certain rate by amplifier 2 and fed to the non-inverting port of first comparator 3. The first comparator 3 compares the amplified signal fed to the non-inverting port with a reference voltage to generate a logic signal DTPL of FIG. 3B. Circuit 100 for generating the logic signal DTPL is formed by a monostable multivibrator for controlling the generation of a tachometer pulse. The logica signal is inverted to a signal of FIG. 3C by first inverter 4 and fed to input port S of S/R flip-flop 8.

At a portion in time T1, when the rising edge of the logic signal DTPL is detected, the tachometer pulse TP is generated from S/R flip-flop 8. The tachometer pulse TP is inverted by second inverter 7 to turn switch SW off. Thus, when voltage applied to the inverting port of second comparator 6 gradually rises as shown in FIG. 3E according to an RC time constant and the voltage applied to the inverting port becomes higher than reference voltage Vref, the output of the second comparator 6, fed to the port R of S/R flip-flop 8, is inverted. Therefore, tachometer pulse TP generated from S/R flip-flop 8 is reset to turn switch SW on. When electrons charged in capacitor C of pulse width controller 10 are emitted, the turned-on switch SW bypasses them. As a result, at time point T2 shown in FIG. 3D, voltage applied to the inverting port of second comparator 6 sharply falls as shown in FIG. 3E to invert the output of second comparator 6. Then, the aforementioned process is repeated.

Taking the tachometer pulse TP as a reference, a head switching signal is generated from head switching controller 11. For instance, a process of generating a head switching pulse signal SWH in a rotary digital audio tape recorder follows.

As shown in FIGS. 4A–4D, during a normal signal processing mode when the drum motor speed reaches 2,000 rpm, in processing, a signal recording start point is generated when the falling edge of the tachometer pulse TP coincides with the falling edge of the head switching pulse signal SWH.

As shown in FIGS. 5A–5D, during the FF/REW search mode, a variable rotation switching signal is generated when the drum motor reaches a speed of 700–3,300 rpm. At this time, the rising edge of the tachometer signal coincides with the falling edge of the head switching signal SWH.

Here, the head switching signal SWH rises when one half of the pulse number (24±α) of a frequency generator (not shown) is counted. The pulse number of a frequency generator varies according to the kind of drive motor.

Meanwhile, the actual adhesion position of the magnet (a distance between the head and magnet) is varied according to motors, which should be considered in phase-locking the output of a pulse generator of a drum and a servo reference frequency (33.3 Hz) into which a master clock is divided so that a trace start point matches a time point when a signal is recorded and reproduced.

Further, even when phase-locking is difficult to achieve with mechanical precision such as in the aforementioned digital audio tape recorder, the width of the output of a pulse generator is electrically converted to freely correct the phases of a head, a pulse generator and a magnet.

As described above in detail, a phase correction circuit of the present invention sets a reference of recording position of a head to a tape and corrects the phase difference between the head, magnet and pulse generator, thereby realizing precise drum phase servo action and acquiring excellent audio and video recording and reproducing.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. In a data recording/reproducing apparatus including a head switching controller and a drum motor pulse generator, a phase-correction circuit comprising:
    first means for converting an analog pulse signal generated from said drum motor pulse generator during magnet detection into a logic signal;
    second means for generating a tachometer pulse according to a state of said logic signal and a control signal, and for controlling generation of a head switching signal of said head switching controller;
    switching means having a first state and a second state based on said tachometer pulse;
    pulse width controller means for correcting said width of said tachometer pulse according to said two states of said switching means; and
    first comparator means for comparing the output of said pulse width controller means with a first reference voltage, to generate said control signal.

2. The phase-correction circuit as claimed in claim 1, wherein said first means comprises:
    amplifier means for amplifying said analog pulse signal to a predetermined level;
    second comparator means for comparing the output of said amplifier means supplied to a non-inverting port with a second reference voltage to generate said logic signal;
    inverter means for inverting said logic signal.

3. The phase-correction circuit as claimed in claim 1, wherein said second means comprises an S/R flip-flop where a first port is connected to said first means and a second port is connected to said switching means.

4. The phase-correction circuit as claimed in claim 1, further comprising:
    inverter means connected between said second means and said switching means, for inverting said tachometer pulse to generate an inverted tachometer pulse; and
    said pulse width controller means comprising a contact point of a variable resistor and a capacitor connected to said switching means, for correcting said width of said tachometer pulse according to said states of said switching means.

5. A phase-correction circuit used in a magnetic recording/reproducing apparatus for correcting the phase difference of a head located on a head drum, a magnet located on the head drum, and a drum motor pulse generator for detecting a location of the magnet, said phase-correction circuit comprising:
    first control means for generating a logic signal in response to an analog pulse generated by the drum motor pulse generator;
    pulse width controller means for adjusting a width of said tachometer pulse signal in response to said first and second states of said switching means, to generate a pulse width control signal;
    first comparator means for comparing a first reference voltage to said pulse width control signal, to generate a reset signal; and
    pulse generating means for generating said tachometer pulse signal based on said logic signal and said reset signal, to control generation of a head switching signal.

6. The phase-correction circuit as claimed in claim 5, further comprising a head switching controller for generating said head switching signal in response to said tachometer pulse signal.

7. The phase-correction circuit as claimed in claim 5, wherein said first control means comprises:

amplifying means for amplifying said analog pulse to generate an amplified analog pulse; and second comparator means for comparing a second reference voltage with said amplified analog pulse to generate said logic signal.

8. The phase-correction circuit as claimed in claim 7, wherein said first control means further comprises an inverter for inverting said logic signal.

9. The phase-correction circuit as claimed in claim 5, wherein said second control means further comprises an inverter connected between said pulse generating means and said switching means.

10. The phase-correction circuit as claimed in claim 5, wherein said pulse width controller means comprises:

a capacitor connected between said switching means at a first node and a first potential; and a resistor connected to a second reference voltage and said first node.

11. The phase-correction circuit as claimed in claim 5, wherein said pulse generating means comprises a flip-flop.

12. The phase-correction circuit as claimed in claim 6, wherein, during normal mode, a signal recording start point is reached when a falling edge of said tachometer pulse signal coincides with a falling edge of said head switching signal.

13. The phase-correction circuit as claimed in claim 5, further comprising:

means for generating a variable rotation switching signal during fast-forward and rewind modes, when a rising edge of said tachometer pulse signal coincides with a falling edge of said head switching signal.

* * * * *

UNITED STATES PATENT AND TRADEMARK OFFICE
CERTIFICATE OF CORRECTION

PATENT NO.  : 5,278,705
DATED       : January 11, 1994
INVENTOR(S) : Hong-jo An

It is certified that error appears in the above-indentified patent and that said Letters Patent is hereby corrected as shown below:

Column 4, Claim 5, Between Lines 51 and 52, Insert the following Paragraph: --switching means having a first state and a second state in response to a tachometer pulse signal;-- .

Signed and Sealed this

Fourth Day of October, 1994

Attest:

Bruce Lehman

BRUCE LEHMAN

*Attesting Officer*    *Commissioner of Patents and Trademarks*